United States Patent
Leiber et al.

[11] 3,832,009
[45] Aug. 27, 1974

[54] ANTISKID CONTROL SYSTEM

[75] Inventors: Heinz Leiber, Leimen; Wolfgang Korasiak, Ketsch, both of Germany

[73] Assignee: Teldix GmbH, Heidelberg, Germany

[22] Filed: June 2, 1972

[21] Appl. No.: 259,029

[30] Foreign Application Priority Data
June 7, 1971 Germany............................ 2128181
Apr. 26, 1972 Germany............................ 2220441

[52] U.S. Cl. .............. 303/21 P, 303/20, 303/21 EB
[51] Int. Cl. .............................................. B60t 8/12
[58] Field of Search ............... 188/181; 303/20, 21; 307/112, 120, 133, 239, 240, 243; 324/161–162, 168; 340/52 R, 53, 262–263

[56] References Cited
UNITED STATES PATENTS
| | | | |
|---|---|---|---|
| 3,494,671 | 2/1970 | Slavin et al. | 303/20 X |
| 3,535,004 | 10/1970 | Howard et al. | 303/20 X |
| 3,556,614 | 1/1971 | Steigerwald | 303/21 CG |
| 3,606,493 | 9/1971 | Schlitz et al. | 303/20 X |
| 3,653,727 | 4/1972 | Kullberg et al. | 303/20 X |

*Primary Examiner*—Trygve M. Blix
*Assistant Examiner*—Stephen G. Kunin
*Attorney, Agent, or Firm*—Spencer & Kaye

[57] ABSTRACT

An antiskid control system for vehicles includes members for controlling the brake pressure. At least two sensors are operatively associated with different wheels of the vehicle to be braked. These sensors produce signals at their respective outputs which are respectively related to the rotational behavior of respective wheels. A circuit arrangement is coupled between the members for controlling brake pressure and the two sensors and is responsive to output signals therefrom for regulating brake pressure. The circuit arrangement includes a switching circuit and a signal evaluation channel. The switching circuit is operatively arranged to connect each of the sensors in a predetermined sequence to the signal evaluation channel. The output of which is coupled to the members for controlling brake pressure.

18 Claims, 6 Drawing Figures

ANTISKID CONTROL SYSTEM

BACKGROUND OF THE INVENTION

This invention relates to an antiskid control system for vehicles. The present invention relates, more particularly, to an antiskid control system for vehicles in which at least two sensors are provided which are operatively associated with different wheels or groups of wheels of the vehicle and in which, upon the occurrence of a tendency to lock, control signals for the variation of the brake pressure at the associated brakes are produced in an electronic circuit in response to output signals from the sensors.

Antiskid systems are known in which each wheel sensor has operatively associated with it a transmission and evaluation channel, control signals being produced in each channel for the variation of the brake pressure at the respective wheel when there is a tendency of such wheel to lock. Such systems operate optimally; however, they are very complicated, require many parts, and consequently are expensive.

It has been proposed, to reduce expenditures, to provide a circuit arrangement which influences the brakes of the wheels of one axle by an evaluation circuit which is common to such wheels. The control can, in such a case, become effective if at least one of the wheels of the one axle shows a tendency to lock. This type of control is often referred to as a select-low control. In a related circuit arrangement, often referred to as a select-high control, control is effected if a tendency to lock or locking is sensed at both wheels of the one axle. With these simplified control systems, which are particularly intended for the rear wheel brakes of a vehicle, each wheel has operatively associated with it a sensor which produces a pulse train, for example, whose respective pulse repetition rate is proportional to the speed of rotation of the respective wheel. Each sensor is connected to a converter which produces a direct voltage directly proportional to the sensed pulse repetition rate and thus the speed of the respective wheel. The output voltages of these converters are fed to the evaluation circuit. With a select-low control, the evaluation circuit determines, separately for both signals, whether their time sequence indicates a strong deceleration and/or the occurrence of an undue slip at the associated wheel, so that the regulation of the brake pressure is actuated at both wheels of the one axle. In spite of the simplified control system, the expenditures for converters and evaluation circuits remain considerable. Moreover, all circuit parts must also be monitored by a safety circuit to assure faultfree operation.

SUMMARY OF THE INVENTION

It is an object of the present invention to reduce the cost of antiskid systems.

It is another object of the present invention to provide an improvement in an antiskid control system which has relatively fewer parts than known systems, and which achieves comparable control levels.

It is a further object of the present invention to provide an improvement in an antiskid control system which involves multiple use of circuit elements.

The foregoing objects, as well as others which will become apparent from the text which follows, are accomplished in accordance with the present invention in an antiskid control system for vehicles which includes members for controlling brake pressure and at least two sensors which are operatively associated with different wheels of the vehicle to be braked. These sensors produce signals at their respective outputs which are respectively related to the rotational behavior of respective wheels. A circuit arrangement is coupled between the members for controlling brake pressure and the two sensors and is responsive to output signals therefrom for regulating the brake pressure. The circuit arrangement includes a switching circuit and signal evaluation channel. The switching circuit is operatively arranged to connect each of the sensors to the signal evaluation channel in a predetermined sequence, the output of the evaluation channel being coupled to the members for controlling the brake pressure.

The present invention utilizes at least parts of a transmission and evaluation circuit arrangement for two or more sensor signals. This constitutes a substantial simplification, particularly if it is considered that this double or multiple utilization of circuit elements also results in a simplification of the safety circuit.

According to the present invention, it is not significant whether the sensors furnish signals only for the acceleration and deceleration of the wheel, or the value dependent on the speed of rotation of the wheel or whether both types of sensor signals are utilized for the control.

If the sensors operatively associated with respective wheels, as is usual, each produce a respective pulse train whose pulse repetition rate is proportional to the speed of rotation of the respective wheel, a simple embodiment of the present invention provides that the commonly utilized channel contain only the converter to convert the pulse trains into respective direct voltages directly dependent in value on the speed of rotation of the respective wheels. The common channel also preferably includes the entire evaluation circuit for producing control signals to vary the brake pressure. The output signals of the evaluation circuit serve for the common control of the brake pressure at the wheel brakes with which the sensors included in the scanning are associated. This type of control is applicable, in particular, when the wheels of one axle, especially the driven axle, are included.

According to another embodiment, the subsequently occurring output signals of the common channel originating from different wheels or groups of wheels (this includes the case, for example, where only one sensor is assigned to the driven wheels which monitors for example the speed of the drive shaft) are utilized for the separate control of the pressure at the wheel brakes associated with the individual sensors. In this case, the succession of output signals are separated which necessitates a demultiplexer or signal distributor operating in synchronism with the multiplexer or scanning switching circuit arrangement for the sensors.

The activation of the connection between sensors and the channel and, if required, the separation at the channel output may be controlled by a continuously rotating switching device or the like which operates at a given rate of, for example, 20 Hz. It is, however, also possible that the brakes would have to be tuned in such a way that one wheel would always show a locking tendency before the others even with the same footing and amount of braking, in the unbraked state and as long as there is no tendency to lock, the sensor of this sensitively set wheel is connected with the channel and the actuation of the other sensors takes place only after this wheel has demonstrated a tendency to lock and has already been controlled back into a state which permits checking and regulation of the other wheels. In this case, the brakes would have to be tuned in such a manner that one wheel would always demonstrate a tendency to lock before the others even with the same footing and braking level.

With the use of the above-mentioned continuously operative switching circuit arrangement, a preferred embodiment of the present invention provides that the further actuation is always interruped, i.e., the sensor which happens to be connected to the channel and, for separation at the channel output, also the associated presently connected pressure control device remain connected to the channel if a signal appears which indicates a tendency to lock. The connection of these members to the channel can be maintained until the presently controlled wheel has again reached a stable speed range. Generally this is the case when the brake pressure begins to rise again so that the beginning of the pressure increase may serve as a criterion for switching to the next sensor and, if required, to the next wheel brake. During checking and regulation in the other channels the pressure must be able to rise again. However, in a control system which always effects a waiting period, in the form of a constant pressure period after increases and/or decreases in pressure, it is also possible to effect the switching to one or a plurality of other sensors during this constant pressure phase, it then also being necessary to maintain the constant pressure period at this wheel. The above-mentioned interruption of the control cycle is preferably effected when a signal is produced which effects a reduction in pressure.

According to one embodiment of the present invention, the sensors are connected with the channel input via gates which are alternately enabled by pulses. When more than two sensors are used, a stepping switch is provided which switches through a gate in each one of its successively assumed positions.

When a continuously operating pulse generator whose output signals are blocked during the interruption of the switching is used to control the switching, no immediate switching to the next sensor is assured when the blocking signal disappears. Rather, the switching depends on the accidental operating state of the pulse generator. In order to effect immediate switching, however, it is proposed to provide additional circuitry which produces a pulse upon the occurrence of the state in which the switching to another sensor is to take place which pulse initiates the immediate switching to the next sensor.

According to one embodiment of the present invention a nondriven wheel is finely regulated, i.e., for this wheel there exists, in addition to rising-pressure and falling-pressure control states, a pressure-constant control state, while the other wheels are only coarsely regulated, i.e., have only the falling-pressure and rising-pressure control states. In this case, the speed of the finely regulated wheel is preferably incorporated in the generation of a reference value signal which approximates the speed of the vehicle, this reference value signal being obtained in a known manner by means of a memory circuit. It is here assumed that the speed of the finely controlled wheel fluctuates around the threshold of optimum slip. The other wheels are then fully controlled, i.e., they use the thus produced reference signal value, or a part thereof, as a comparison value signal for the determination of slip. In order to improve further the accuracy of the reference value signal, the sensor of the finely controlled wheel is connected with the channel more often than the sensors of the other wheels. Preferably this connection is effected during every second clock pulse sequence.

It is insignificant for the present invention whether there is a pure slip regulation, a pure regulation through wheel acceleration and wheel deceleration signals or a mixed regulation with the use of slip and acceleration signals. The mixed regulation, however, is preferred.

DETAILED DESCRIPTION OF THE PREFERRED EMBODIMENTS

Figure 1:
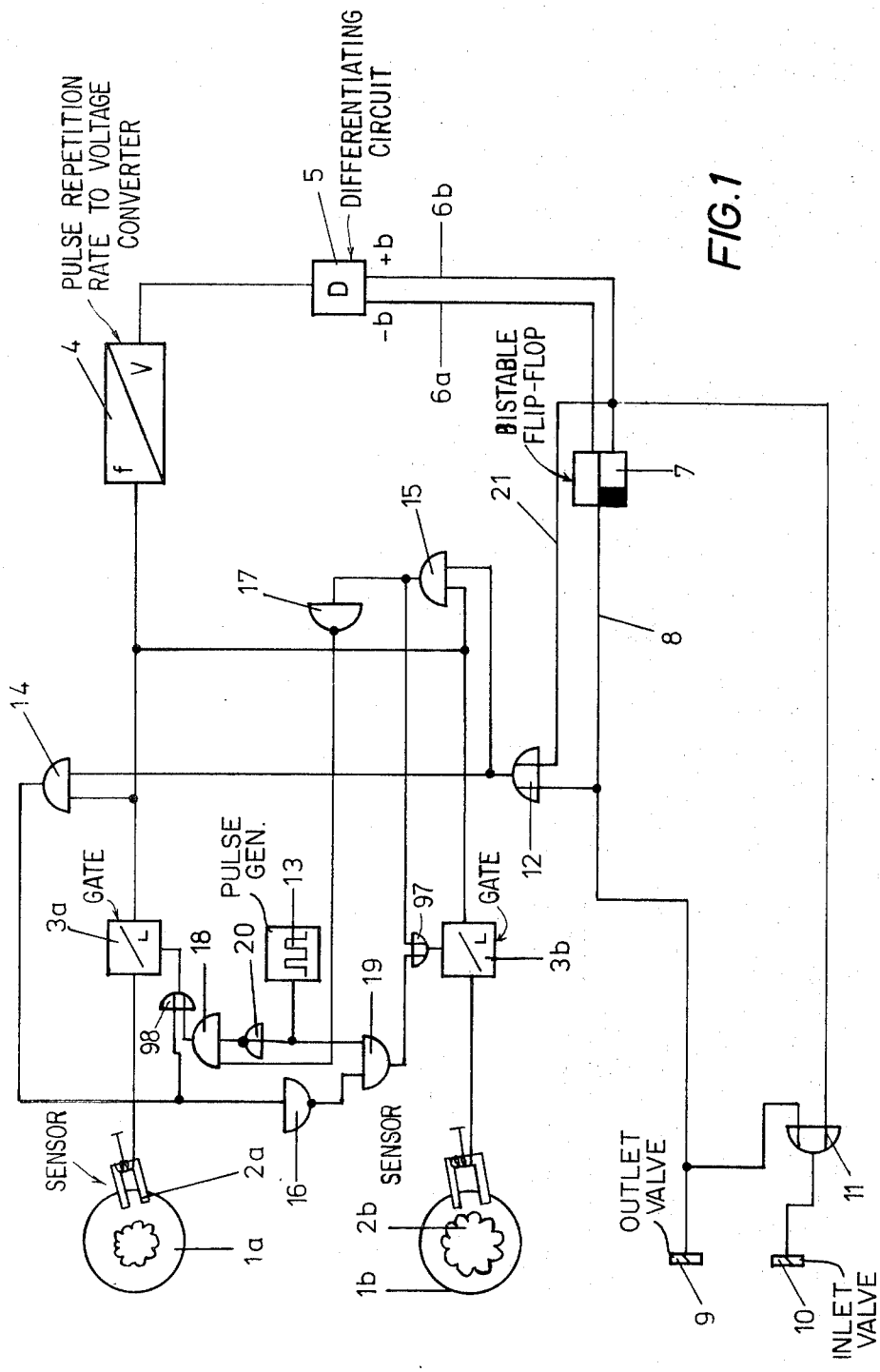
FIG. 1 is a schematic diagram of an exemplary embodiment of the present invention in which one channel is used to control the two rear wheels of a vehicle.

Referring to FIG. 1, the antiskid control system of the present invention, as illustrated, includes two wheels $1a$ and $1b$ of the rear axle of a vehicle to be braked. A pair of sensors $2a$ and $2b$ are operatively associated with the respective wheels $1a$ and $1b$ for producing pulse trains in response to the rotation of the respective wheels $1a$ and $1b$. The pulse repetition rates of the pulse trains are proportional respectively to the speeds of the respective wheels $1a$ and $1b$. These pulse trains are fed respectively to controllable gate circuits $3a$ and $3b$ which are alternatingly enabled so that the pulse trains from the sensors $2a$ and $2b$ are alternatingly fed to a pulse repetition rate to voltage converter 4 which also preferably contains an amplifier. The consecutively occurring direct voltages at the output of the converter 4, which are proportional to the speed of rotation of the respective wheels $1a$ and $1b$, are fed to a differentiating circuit 5 which contains two threshold level switching circuits. Such circuits are known, for example, from U.S. Pat. No. 3,494,671.

The circuit 5 operates so that upon the occurrence of a given threshold value $-b$ for the wheel deceleration, a signal appears on an output line $6a$ from the differentiating circuit 5. Upon the occurrence of a predetermined threshold value $+b$ for the wheel acceleration, a signal appears on the line $6b$ from the differentiating circuit 5. A signal on the line $6a$ flips a bistable flip-flop circuit 7 into a first stable condition in which a signal appears on a line 8 from the flip-flop circuit 7. This signal actuates, via an OR gate 11, an inlet valve 10 and also directly an outlet valve 9. At the same time, via an OR gate 12, a signal from the line 8 causes that one of the sensors 2a, 2b whose signal caused the bistable flip-flop circuit 7 to flip to remain connected to the converter 4.

The alternating opening and closing of the gate circuits 3a and 3b is effected by an astable multivibrator 13, which operates for example at a set pulse repetition rate of 50 Hz and at a pulse-to-pulse interval ratio of "one." If no signal is present on the line 8, two AND gates 14 and 15 receive a 0 signal at their respective inputs; thus, their output signals are, under these conditions, also 0. Two inverters 16 and 17, which are respectively connected to the outputs from the AND gates 16 and 17, produce a signal L at their respective outputs which are applied respectively to first inputs of respective AND gates 18 and 19. Under these conditions, both the AND gates 18 and 19 will produce an output signal whenever a pulse is fed thereto. An output pulse from the multivibrator 13 thus reaches, via the AND gate 19 and a further OR gate 97, the gate circuit 3b and enables it. In contradistinction thereto, the gate circuit 3a remains blocked upon the occurrence of an output pulse from multivibrator 13 because of the presence of an inverter 20 in the path between the multivibrator 13 and the AND gate 18. During the intervals in the pulse train from the astable multivibrator 13, the gate circuit 3a becomes enabled due to the presence of the inverter 20, and the gate circuit 3b is blocked. Thus the pulse sequences from the sensors 2a and 2b are alternately fed to the converter 4 at a repetition rate of 50 Hz.

If the bistable flip-flop circuit 7 is flipped upon the occurrence of a deceleration signal, an output signal appears at one of the AND gates 14 and 15. If, for example, the sensor 2a just happens to be connected with the converter 4 (and the deceleration signal has been furnished) an output signal appears from the AND gate 14 which blocks the AND gate 19 via the inverter 16 so that no further switching pulse can reach the gate circuit 3b. At the same time the output signal from the AND gate 14 keeps the gate circuit 3a continuously enabled via an OR gate 98. If, however, after the flipping of the bistable flip-flop circuit 7, the gate circuit 3b has just been enabled, an output signal from the AND gate 15 blocks the AND gate 18 so that the gate circuit 3a remains blocked. This signal simultaneously causes the gate circuit 3b to be enabled.

The actuation of the outlet valve 9 and the inlet valve 10 as well as the continued switching of one of the sensors 2a and 2b to the converter 4 is effected by the occurrence of a deceleration signal. Actuation of the valves 9 and 10 causes the brake pressure to be lowered so that at first the deceleration signal disappears. Since the bistable flip-flop circuit 7 now also remains in its set condition, nothing further changes. Only upon the occurrence of an acceleration signal on the line 6b does the bistable flip-flop circuit 7 flip back to its starting condition so that the signal on the line 8 disappears. The outlet valve 9 now closes, but the inlet valve 10 continues to be kept closed by the acceleration signal. Thus the pressure is kept constant. Upon the flipping back of the bistable flip-flop circuit 7, the alternating switching of the sensors 2a and 2b is not as yet initiated because the acceleration signal keeps the previous state in effect via a line 21 which connects the line 6b to the OR circuit 12. Only when the acceleration signal disappears, which occurs when the wheel involved has again started moving in the stable speed range, the two sensors 2a and 2b are alternatingly switched to the converter 4. At the same time, the inlet valve 10 reopens.

In the selected example deceleration and acceleration signals are derived from the arriving signals from the sensors 2a and 2b. Instead of this type of control or in addition thereto a slip control may be provided in which the output voltage of the converter 4 which corresponds directly to the speed of the respective wheels 1a and 1b is compared with a reference signal which corresponds, at least approximately, to the speed of the vehicle and when an undue slip occurs the valves 9 and 10 are also actuated and the switching at the input is interrupted. The signal produced upon the occurrence of undue slip would then have to actuate the bistable flip-flop circuit 7. When a pure slip control is employed, a reset signal would have to be formed which occurs when the slip or reacceleration falls below a certain value. For a control base on slip and deceleration, the acceleration signal will again be utilized for this purpose. A disclosure of how the inlet and the outlet-valve may be connected to the brake pressure line of the vehicle is shown for example from U.S. Pat. No. 3,645,584.

The antiskid control system shown in FIG. 1 involves a select-low control. A select-high control can also be effected. It must then be determined, with the aid of the two successively arriving output voltages from the converter 4 whether both wheels show a tendency to lock so that the converter 4 then remains connected to that one of the sensors 2a and 2b whose associated wheel 1a or 1b last showed a tendency to lock. This particular state, and thus the evaluation of the signals from this particular sensor, remain in effect until its associated wheel has again become stabilized. This is not a pure select-high control. For a pure select-high control, the control would be terminated as soon as one wheel had again reached its stable state.

Figure 2:
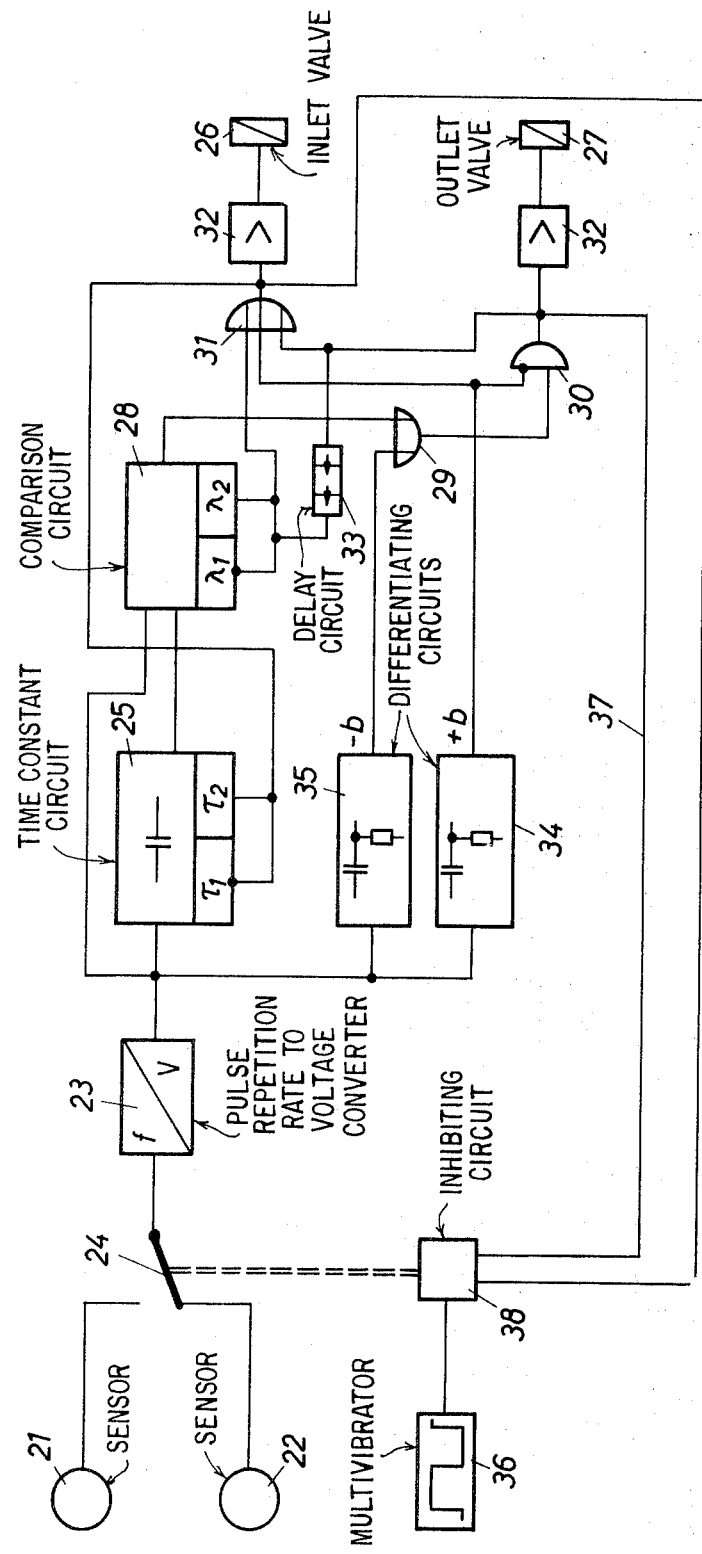
FIG. 2 is a schematic diagram of a second embodiment of the present invention similar to the embodiment of FIG. 1 illustrating a different control concept using acceleration and deceleration signals.

In the antiskid control system of the present invention, as illustrated in FIG. 2, it is assumed that the two wheels of the rear axle of a front-wheel drive vehicle are being jointly controlled. The control is effected, in this case, by slip signals and by deceleration and acceleration signals.

As shown in FIG. 2, the control system of the present invention includes two wheel sensors 21 and 22 operatively associated with the two rear wheels (not illustrated) of a vehicle which is to be braked. These two sensors 20 and 21, which furnish respective pulse trains, are normally alternatingly connected to a pulse repetition rate to voltage converter 23 via a switch 24. The converter 23 produces at its output a direct voltage proportional to the speed of rotation of the particular wheel associated with the sensor then feeding the converter. A time constant circuit 25 generates a reference signal which is an approximation of the vehicle speed. This time constant circuit 25 may for example be a known memory circuit which is quickly charged to the applied voltage and which discharges, with a given discharge time constant, when its input signal decreases. In the present case the time constant circuit 25 is a memory circuit with a controllable discharge time constant. In the normal case the time constant $\tau_1$ is effective which effects very rapid discharge and thus permits the memory circuit 25 to follow the applied voltage. If a tendency to lock is sensed, the system is switched to higher discharge time constant $\tau_2$ which permits only very slow discharging. In the embodiment of FIG. 2, in which the regulation of the brake pressure is effected at the rear wheels by a normally open inlet valve 26 connected in the brake line (which valve blocks the main pressure line upon excitation) and a normally closed outlet valve 27 (which permits discharge of brake fluid from the wheel brake cylinder upon excitation), the switching of the time constant of the time constant circuit 25 takes place upon excitation of the inlet valve 26. Switching back occurs when the inlet valve 26 is de-excited, i.e., when the wheel has reached its stable speed range again and no longer furnishes an acceleration signal. In a comparison circuit 28 a voltage corresponding to the rotational speed of the connected wheel is compared with a given component voltage level (e.g. percentages) of the reference voltage signal. The comparison circuit 28 produces a slip signal when the effective given component voltage level of the reference voltage signal has been exceeded downwardly. Normally the lower slip threshold $\tau_1$ (e.g. 85 percent of the reference signal) is effective. When the slip falls below that value, an output signal appears which switches the valves 26 and 27, via an OR gate 29, an AND gate 30, an OR gate 31 and two converters or power amplifiers 32 and 32' and thus lowers the pressure. At the same time, time delay circuit 33, which effects a slight delay (of, for example, 10–20 msec.) and an extension of the duration (of, for example, 40 msec.) of the passing signal, switches the comparison circuit 28 to a higher slip threshold of, for example, 95 percent of the reference voltage signal. The outlet valve 27 is again closed when either this slip threshold is again exceeded or, via a differentiating circuit 34 when the AND gate 30 is blocked, upon the occurrence of a given wheel acceleration as indicated by an output signal from the differentiating circuit 34. The control can also be initiated, in the same manner, when a certain deceleration of the connected wheel is noted by means of a second differentiatng circuit 35.

In addition, similar to the systems disclosed in the co-pending commonly assigned patent application of Rodi et al, Ser. No. 198,336, filed Nov. 12, 1971, now U.S. Pat. No. 3,754,797, issued Aug. 28, 1973, a pulse generator may be provided which effects, in addition to a rapid pressure build-up and pressure reduction, a staggered pressure build-up and reduction under certain conditions. Since the configuration of the control circuit is not part of the present application, it need not be discussed here.

The switching of the switch 24, which in practice is an electronic switch, is effected by means of a multivibrator 36. If the output valve 27 is excited, an inhibiting member or circuit 38 is brought into action to interrupt the switching of the switch 24 and keeps the then connected wheel sensor 21 or 22 connected to the converter 23 whose output signal has just previously indicated a tendency to lock. The further switching of the switch 24 is initiated again as soon as the pressure build-up is resumed of which the inhibiting member or circuit 38 is informed by the de-exciting of the inlet valve 26 via a line 39. Favorably the other wheel is switched on as soon as this signal occurs. Or the interruption of the switching may be made dependent only of the excitation of the inlet valve 26.

There thus results the following mode of operation for the arrangement according to FIG. 2:

Unbraked or during braking without tendency to lock the wheel sensors 21 and 22 are alternatingly connected with the converter 23 and with the entire subsequently connected evaluation circuitry. If one of the wheels shows a tendency to lock, either because an undue deceleration is occurring or an undue slip signal appears, the pressure reduction is initiated and at the same time the further switching of the switch 24 is interrupted. The corresponding one of the wheel sensors 21 and 22 remains connected to the evaluation circuitry until the wheel involved has again reached the stable speed range which is the case when the control system again permits a pressure build-up.

Although two sensor signals are normally checked, only one converter 23 and one comparison circuit 28 with its associated circuitry are required.

Figure 3:
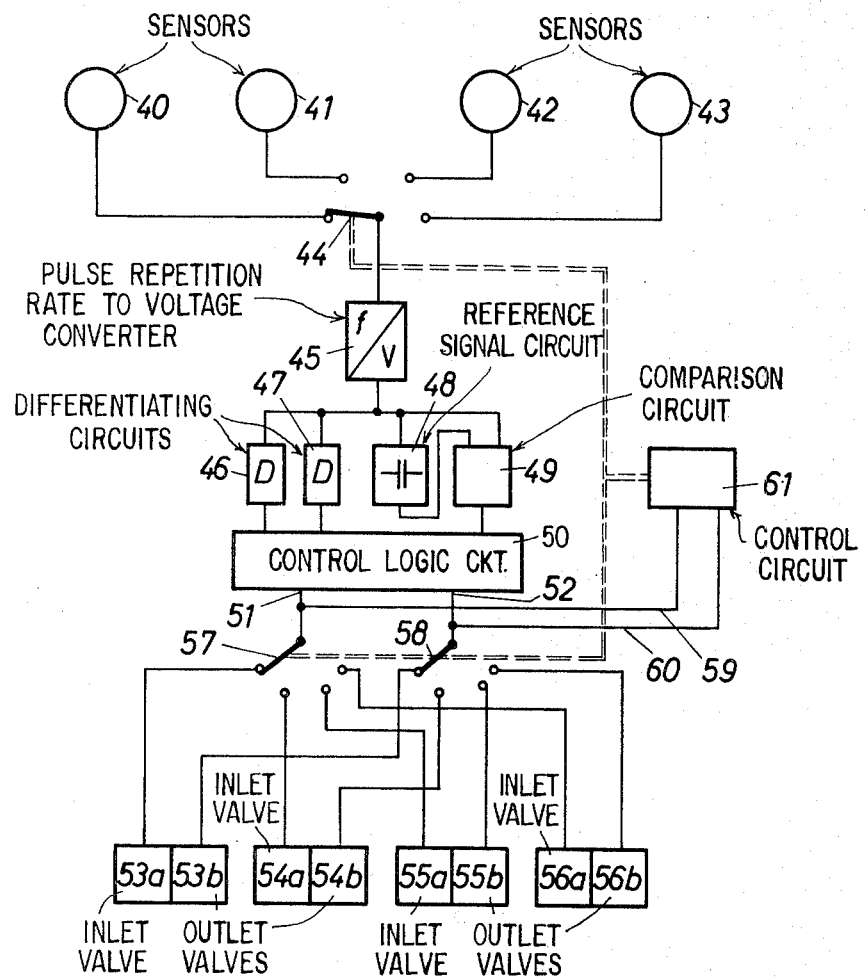
FIG. 3 is a schematic diagram of an embodiment of the present invention in which four-wheel control is effected with the use of a transmission and evaluation channel.

In a further embodiment of the present invention shown in FIG. 3, wheel spaced sensors 40 to 43 operatively associated with the four wheels of a vehicle to be braked are connected in succession to a pulse repetition rate to voltage converter 45 by means of a switch 44, the output of the converter 45 being connected to a differentiating circuit 46 which produces a signal at a certain negative wheel acceleration, to a differentiating circuit 47 which produces a signal at a certain positive wheel acceleration, to a circuit 48 which produces a reference signal and to a comparison circuit 49 for comparing the voltage which is proportional to the speed of the wheel with a portion of the reference signal. The signals from the circuit members 46, 47 and 49 are coupled to logic circuit 50 which produces at its outputs 51 and 52 signals to control respectively the inlet valves 53a to 56a and outlet valves 53b to 56b which are operatively associated with respective individual wheel brakes. The feed to the respective valves is effected by two switches 57 and 58 which are linked and operate in synchronism with the switch 44.

Figure 4:
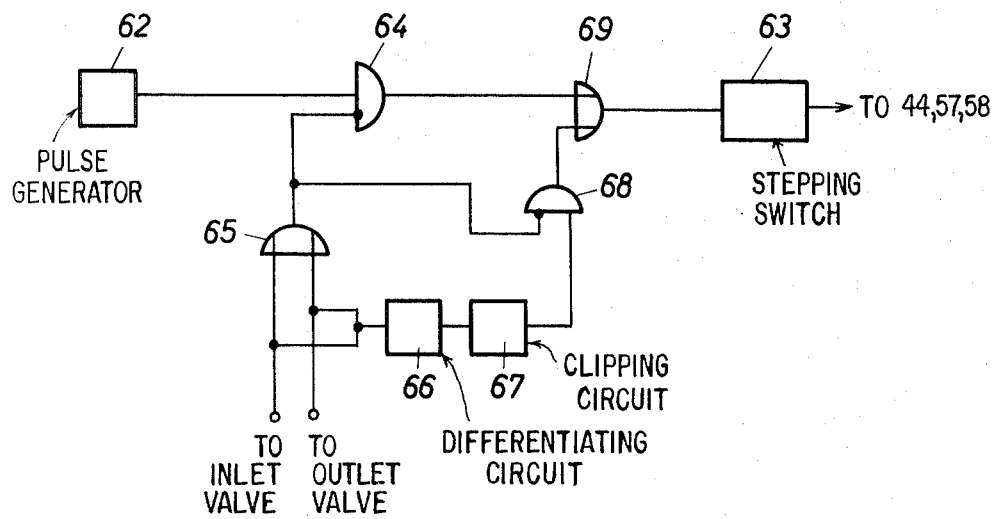
FIG. 4 is a detailed schematic diagram of a control circuit particularly suitable for use in the system of FIG. 3.

If at least one of the valves is excited based on the control signals for one inlet and/or outlet valve, i.e., if it is determined that a constant pressure phase or a pressure reduction is necessary for the wheel being monitored, a control circuit 61 for the switches 44, 57 and 58 is blocked via a line 59 and/or a line 60. The blockage continues until the valves are de-excited again. A possible configuration for the control circuit 61 is shown in FIG. 4. It consists of a pulse generator 62 which produces a train of pulses at a given pulse repetition rate (e.g. 20 Hz) whose pulses switch a stepping switch 63 having four stages. The stepping switch 63 itself produces the four possible through connections according to the switching positions of the switches 44, 57 and 58. An AND gate 64 is connected in the path of the pulses from the pulse generator 62 which gate is blocked when a signal fed to an inlet valve or to an outlet valve is present at the input of an OR gate 64. As soon as the input signals from an OR gate 65 disappear, the AND gate 64 is enabled again.

Additionally, a circuit is provided for switching on the stepping switch 63 which, immediately upon the disappearance of the input signals from the OR gate 65, switches on the stepping switch 63, so that further switching does not depend on this accidental signal output of the pulse generator 62. This circuit consists of a differentiating circuit 66 which produces spike pulses when the signals at the inputs of the OR gate 65 change. Of these spike pulses a clipping circuit 67 permits the spike pulses produced by the trailing edges to pass. If none of the control signals is present any longer, the ANd gate 68 permits the corresponding spike pulse to pass which effects the immediate switching on, via an OR gate 69 of the stepping switch 63. The output pulse from the AND gate 68 can additionally be used to synchronize the pulse generator 62.

The parts 46 – 49 may be identical to the parts 34, 35, 25, 28 of FIG. 2 and the logic-circuit 50 may comprise the parts 29 – 33 of the same FIG., the outputs 51 and 52 then being identical with the outputs of the amplifiers 32 and 32'.

The control circuit shown in FIG. 3 operates as follows:

Without braking or with braking without there being a tendency to lock, the wheels are being monitored in a given sequence. If a tendency to lock occurs at a wheel, i.e., if the logic circuit 50 produces a signal calling for constant pressure or for pressure reduction, the switching of the switches 44, 57 and 58, e.g. by the stepping switch 63 of FIG. 4, is interrupted until pressure build-up is again recommended for the wheel. Then the system is immediately switched to the next wheel until a wheel has been found again which shows a tendency to lock.

In spite of single wheel control only one converter 45 and only one evaluation circuit 46–52 are required instead of four evaluation circuits.

Figure 5:
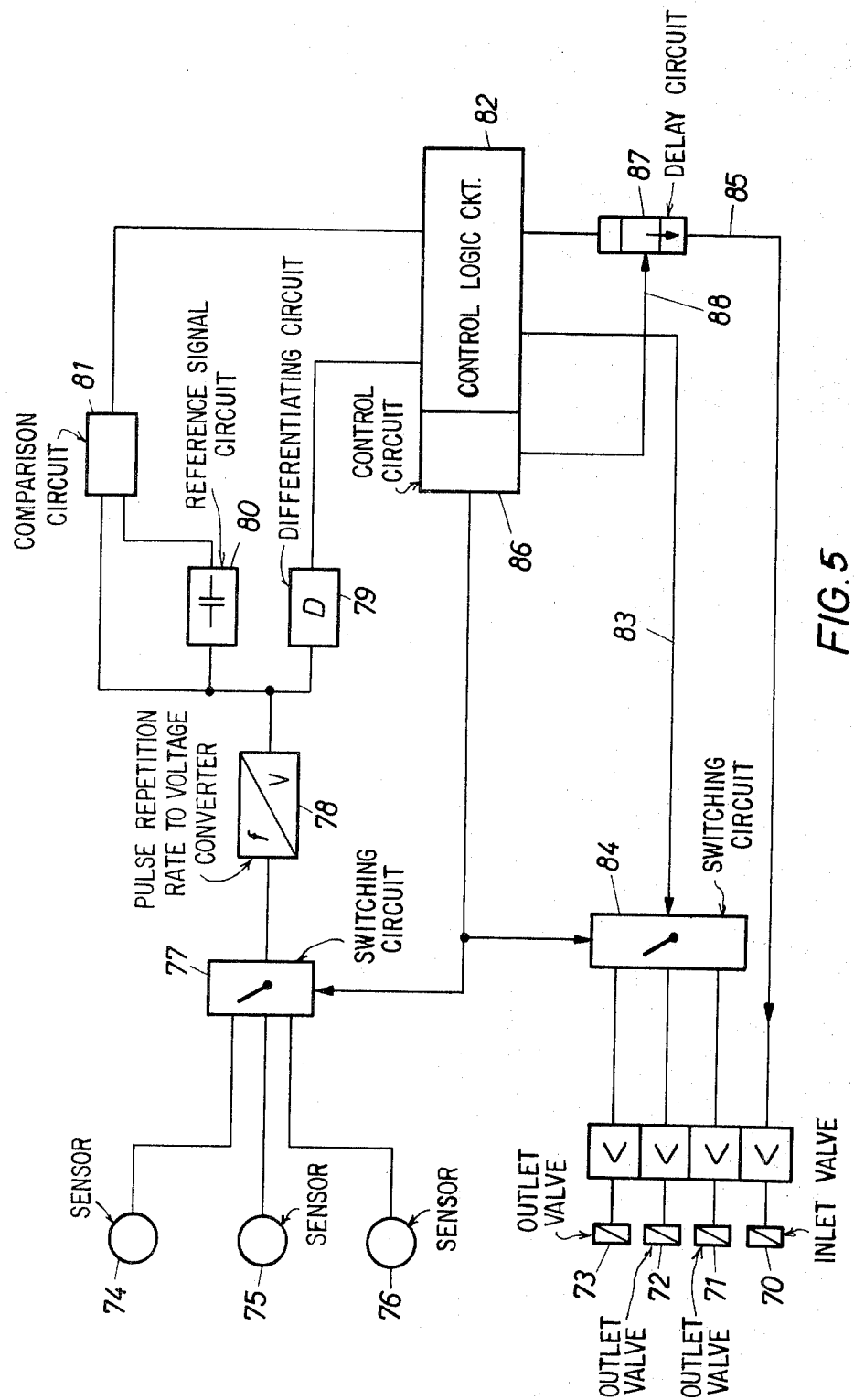
FIG. 5 is a schematic diagram of an embodiment of the present invention in which one wheel is finely regulated while the other wheels are subjected to coarse control.

A further embodiment of an antiskid control system according to the present invention is shown in FIG. 5. As shown in FIG. 5, a nondriven wheel, i.e., the right front wheel, is finely regulated, i.e., only this wheel has an inlet valve 70 and an outlet valve 71 while the pressure regulation at the second front wheel and the common pressure regulation at the two rear wheels are each effected by one inlet/outlet valve 72 or 73. A speed sensor 74 is provided for the right front wheel, a speed sensor 75 for the left front wheel and a speed sensor 76 for the rear wheels, the latter monitoring, for example, the drive shaft for these wheels.

A switching circuit 77 connects the sensors 74 to 76 with a pulse repetition rate to voltage converter 78 and the subsequently connected evaluation circuit in the following sequence: sensor 74 to converter 78, sensor 75 to converter 78, sensor 74 to converter 78, sensor 76 to converter 78, sensor 74 to converter 78, sensor 75 to converter 78, etc. That is, the sensor 74 of the right front wheel is connected to the converter 78 and the evaluation circuit twice as often as the other sensors. The evaluation circuit includes a differentiating circuit 79 for deceleration and acceleration, a circuit 80 for forming the reference signal, a comparison circuit 81 and a logic circuit 82. The logic circuit produces signals for the reduction of pressure in a control line 83 based on the incoming deceleration and acceleration as well as slip signals. These signals reach the associated valves 71, 72 or 73 via a switching cicuit 84 which operates in synchronism with the switching circuit 77 and effect a reduction in pressure at the corresponding wheel. Excitation of the inlet valve 70 is effected via a line 85 leading to the inlet valve 70 whenever a constant pressure is recommended for the right front wheel based on the sensor signals from the right front wheel.

The further switching of the switching circuits 77 and 84 by means of a control circuit 86 is here so designed that the further switching is interrupted each time one of valves 71 to 73 is excited, i.e., whenever a pressure reduction is to take place, the control circuit 86 being responsive to signals of the logic circuit 82.

The further switching is also interrupted when upon the connection of the right front wheel a pressure build-up is to take place at its brake. The further switching is interrupted at the left front wheel and at the rear wheels only if pressure reduction is required, at the right front wheel if pressure build-up and pressure reduction are required. The switching on takes place, at the right front wheel, only when a constant pressure phase is effected there. This constant pressure phase must be maintained beyond the time the other wheels are connected; therefore the constant pressure signal, i.e., the signal for the inlet valve, must be stored and maintained on the line 85, the storage becoming ineffective as soon as the sensor for the right front wheel is connected again to the coverter 78. This type of storage is provided by a controllable time delay circuit 87 connected in the line 85, the storing effect becoming ineffective whenever a signal appears on the line 88 indicating that the right front wheel is connected to the converter 78. The further switching after the stopping of the switching circuits 77 and 84 takes place when the pressure has been reduced, i.e., valves 71 to 73 have been de-excited or the pressure build-up has taken place at the right front wheel and a constant pressure phase follows.

The parts 79, 80 and 81 may be identical to the parts 39, 35, 25 and 28 of FIG. 2, and also the control circuit 82 may be simular to the circuit comprising the parts 29 – 33 of the same FIG. The line 83 is then identical to the line from amplifier 32, to the outlet valve 27. The second output of control circuit 82 leading to the delay circuit 87 can be effective in this embodiment only when the right front wheel is connected to the converter 78.

When the other wheel sensors 75 and 76 are connected, no output signal is produced at that output of the control circuit or a produced output signal is blocked.

Figure 6:
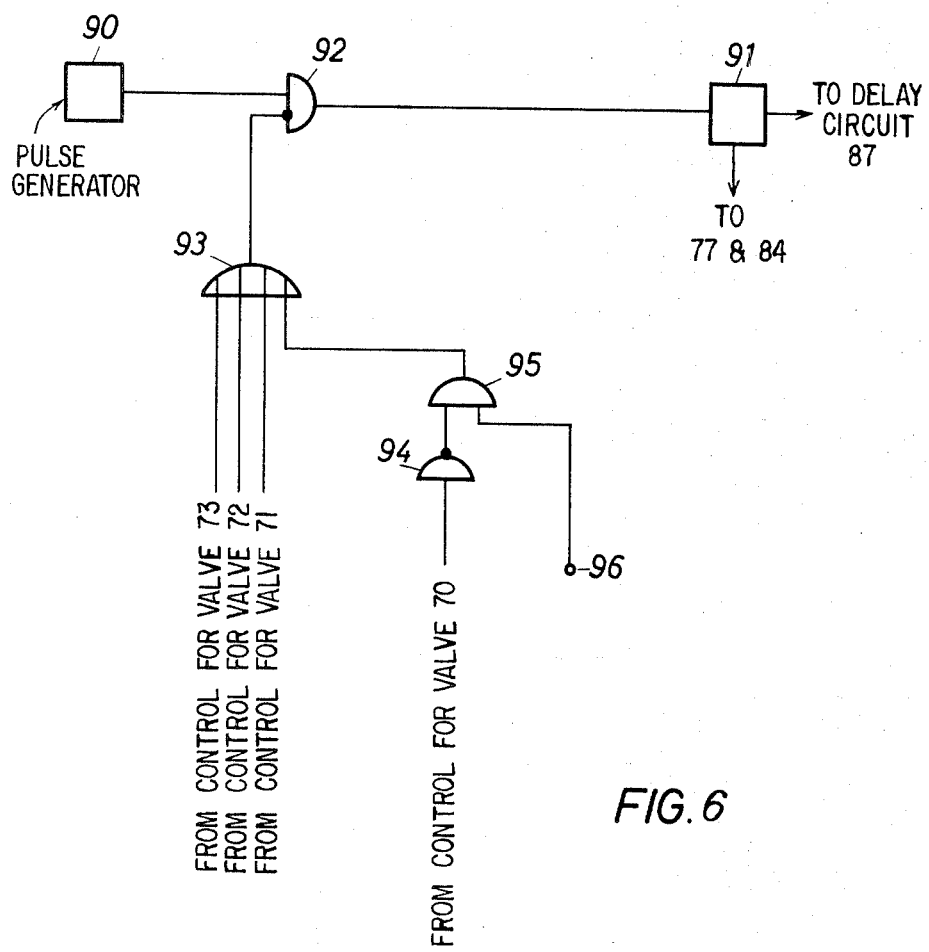
FIG. 6 is a detailed schematic diagram of a control circuit particularly suitable for use in the system of FIG. 5.

The control circuit 86 (FIG. 5) for the switching devices is shown in detail in FIG. 6. The control circuit includes a pulse generator 90 and a stepping switch 91 having the required number of stages. The blockage of the input of switching pulses is effected by means of an AND gate 92 whenever a signal is provided at the input of an OR gate 93 indicating that a control signal is being fed to one of the valves 71 to 73 (FIG. 5) or when no signal is fed to the valve 70 (FIG. 5) during the controll process. Whereas the excitation of one of valves 71 to 73 also indicates pressure reduction, the absence of a control signal for inlet valve 70 and the simultaneous presence of a signal from the control logic circuit 82 indicating that the control for the connected wheel is taking place, indicates that pressure should be built up. The control signal for the inlet valve 70 is negated in an inverter 94 and fed to an AND gate 95 which produces an output signal whenever the valve 70 is not being controlled, but the above-mentioned control signal is present at an input terminal 96. The output signal from the AND gate 95 blocks the AND gate 92 and thus the further switching. The further switching is effected again when the OR gate 93 ceases producing an output signal. Similarly as in FIG. 4 an immediate further switching could take place upon the disappearance of the signals independent of the state of the pulse generator 90.

The control signal at terminal 96 may be the output of a delay circuit, the input of which is connected to the outlet valve 71. Thus the output signal of this delay circuit enables gate 95, when the outlet valve 71 was exited shortly before.

Every time the step switch 91 in FIG. 6 is in a position in which it connects sensor 74 to the inverter 78, it delivers an output signal on line 88 leading to the delay circuit 87 of FIG. 5.

In the described embodiment the more frequently and finer controlled wheel provides a good reference value for the other wheels. Here, too, very good regulation is realized in spite of there being only one evaluation channel.

Although in the evaluation circuits used in the embodiments the slip signals are produced with the aid of analog voltages, the present invention is not limited thereto; the slip signal can also be derived, if desired, from a digital comparison.

It will be understood that the above description of the present invention is susceptible to various modifications, changes and adaptations, and the same are intended to be comprehended within the meaning and range of equivalents of the appended claims.

We claim:

1. In an antiskid control system for vehicles, the control system including means for varying brake pressure, at least two sensors operatively associated with different wheels of the vehicle for producing signals at their respective outputs related to the rotational behavior of respective wheels, and signal evaluation channel means coupled between said means for varying brake pressure and said two sensors and responsive to output signals therefrom for regulating brake pressure, the improvement wherein said control system includes only one signal evaluation channel means, and further comprises switching means connected between said evaluation channel means and each of said sensors for connecting each of said sensors to said evaluation channel means in a predetermined sequence, and means for coupling the successively generated output signals from said one evaluation channel means derived from the signals from sequentially connected sensors to said means for varying the brake pressure to regulate the brake pressure at the brakes associated with the respective sensor.

2. An arrangement as defined in claim 1 wherein said sensors are operatively arranged to produce as their output signals respective pulse trains having pulse repetition rates related to the speed of the respective wheels and said signal evaluation channel means includes pulse repetition rate to voltage converter means coupled between said switching means and the remainder of said signal evaluation channel means.

3. An arrangement as defined in claim 1 wherein said signal evaluation channel means is operatively arranged for producing control signals to control brake pressure.

4. An arrangement as defined in claim 1 wherein said signal evaluation channel means is operatively arranged for producing control signals to control the brake pressure and said means for varying brake pressure is operatively arranged to control commonly the brake pressure at the wheel brakes with which two of said sensors are associated.

5. An arrangement as defined in claim 1 wherein said signal evaluation channel means is operatively arranged for producing control signals to control brake pressure and said means for varying brake pressure is operatively arranged to control separately the brake pressure at the wheel brakes of wheels associated with the individual ones of said sensors.

6. An arrangement as defined in claim 1 further comprising means responsive to an output signal indicating a tendency of a wheel to lock from said signal evaluation circuit means for interrupting the action of said switching means whereby the particular sensor which sensed the tendency to lock remains connected to said signal evaluation circuit means for a period and the scanning in said predetermined sequence of said sensors is temporarily interrupted.

7. An arrangement as defined in claim 6 wherein said means for interrupting the action of said switching means is operatively arranged for assuring the connection of that sensor which senses a tendency to lock to said evaluation circuit means until the wheel with which it is associated has again reached its stable speed range.

8. An arrangement as defined in claim 6 wherein said means for interrupting said switching means is operatively arranged for assuring the connection of that sensor which senses a tendency to lock to said evaluation channel means until the brake pressure remains substantially constant as a result of signals from that particular sensor, this constant pressure phase being maintained during connection of the other sensor or sensors.

9. An arrangement as defined in claim 6 wherein said means for interrupting said switching means is operatively arranged for assuring the connection of that sensor which senses a tendency to lock to said evaluation channel means until the brake pressure is raised as a result of signal from that particular sensor, this raising pressure phase being maintained during connection of the other sensor or sensors.

10. An arrangement as defined in claim 6 wherein said means for interrupting the action of said switching means is responsive to a signal from said signal evaluation circuit means which actuates a reduction in brake pressure.

11. An arrangement as defined in claim 1 wherein said switching means includes gates each coupled between the output of a respective one of said sensors and the input of said evaluation channel means, and logic means including a pulse generator means for alternately enabling said gates.

12. An arrangement as defined in claim 11 wherein said means for enabling said gates further includes stepping switch means, which are responsive to the output pulses from said pulse generator, for alternately enabling said gates for connecting individual ones of said sensors to said evaluation channel means in each one of its successively occurring positions.

13. An arrangement as defined in claim 7 further comprising means responsive to an output signal from said evaluation channel means indicating further interruption of the switching action is not required for controlling said switching means to assure the immediate further connection of the next following sensor of said sensors.

14. An arrangement as defined in claim 1 wherein said means for varying brake pressure includes control means for the brake of a non-driven wheel operatively arranged to permit pressure-increase, pressure-substantially-kept-constant and pressure-falling states and control means for the brakes of other wheels operatively arranged to permit only pressure-increase and pressure-falling states, said switching means being operatively arranged to connect that sensor associated with said non-driven wheel to said evaluation channel means more frequently than the other sensor, and further comprising means for developing slip signals in said evaluation channel means.

15. An arrangement as defined in claim 14 wherein said switching means is operatively arranged to connect that sensor associated with the non-driven wheel to said evaluation channel means after each connection of any of the other sensors before the next of the other sensors is connected.

16. An arrangement as defined in claim 1 wherein said evaluation channel means includes means for developing slip signals and for utilizing same to regulate the brake pressure.

17. An arrangement as defined in claim 1 wherein said evaluation channel means includes means for developing positive and negative acceleration signals and for utilizing same to regulate the brake pressure.

18. An arrangement as defined in claim 16 wherein said evaluation channel means includes means for developing positive and negative acceleration signals and for utilizing same to regulate the brake pressure.

* * * * *